United States Patent [19]

Reens

[11] Patent Number: 5,525,268
[45] Date of Patent: Jun. 11, 1996

[54] HUMIDIFYING SYSTEM

[75] Inventor: Daniel J. Reens, Ridgefield, Conn.

[73] Assignee: Cool Fog Systems, Inc., Norwalk, Conn.

[21] Appl. No.: 409,311

[22] Filed: Mar. 23, 1995

Related U.S. Application Data

[62] Division of Ser. No. 163,115, Dec. 6, 1993, Pat. No. 5,463,873.

[51] Int. Cl.$^6$ ............................................. B01F 3/04
[52] U.S. Cl. ........................ 261/78.2; 261/116; 239/61
[58] Field of Search ................................ 261/116, 78.2; 239/61

[56]   References Cited

U.S. PATENT DOCUMENTS 3,842,615  10/1974  Reiger et al. ........................... 261/116
4,705,535  11/1987  Lipp ........................................ 239/61
4,980,099  12/1990  Myers et al. ........................... 261/116
5,193,354   3/1993  Kleinberger et al. ................. 261/78.2
5,303,652   4/1994  Gasparrini et al. ..................... 239/61

*Primary Examiner*—Tim R. Miles
*Attorney, Agent, or Firm*—St. Onge Steward Johnston & Reens

[57]   ABSTRACT

A system for humidifying an air stream comprising an array of fogger nozzles supplied with air and water by a grid of supply tubes, feedback means connected to the grid of air supply tubes and coupled to the pressure regulating means for the air and water supply tubes, for establishing a predetermined pressure differential between the grids of air and water supply tubes.

4 Claims, 4 Drawing Sheets

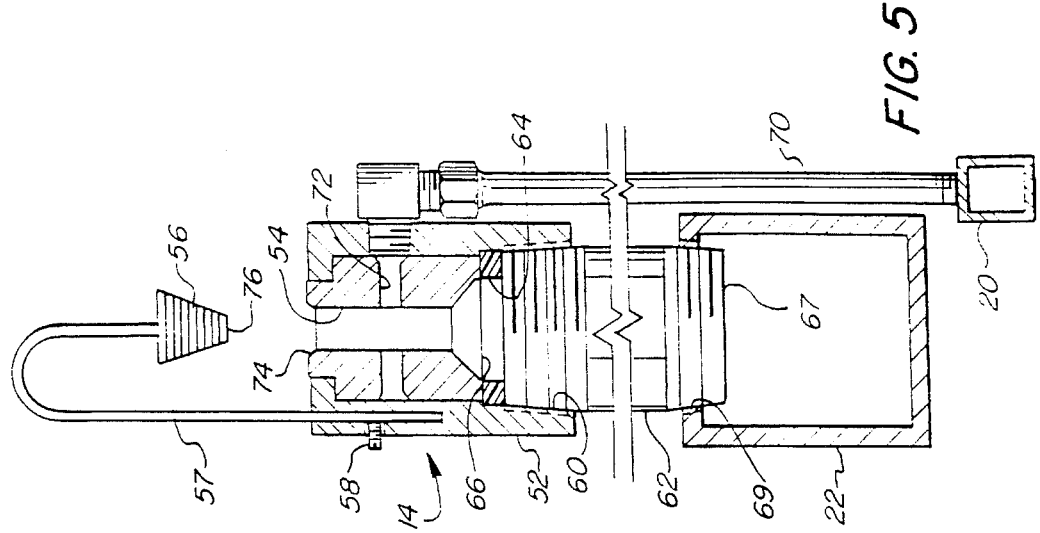
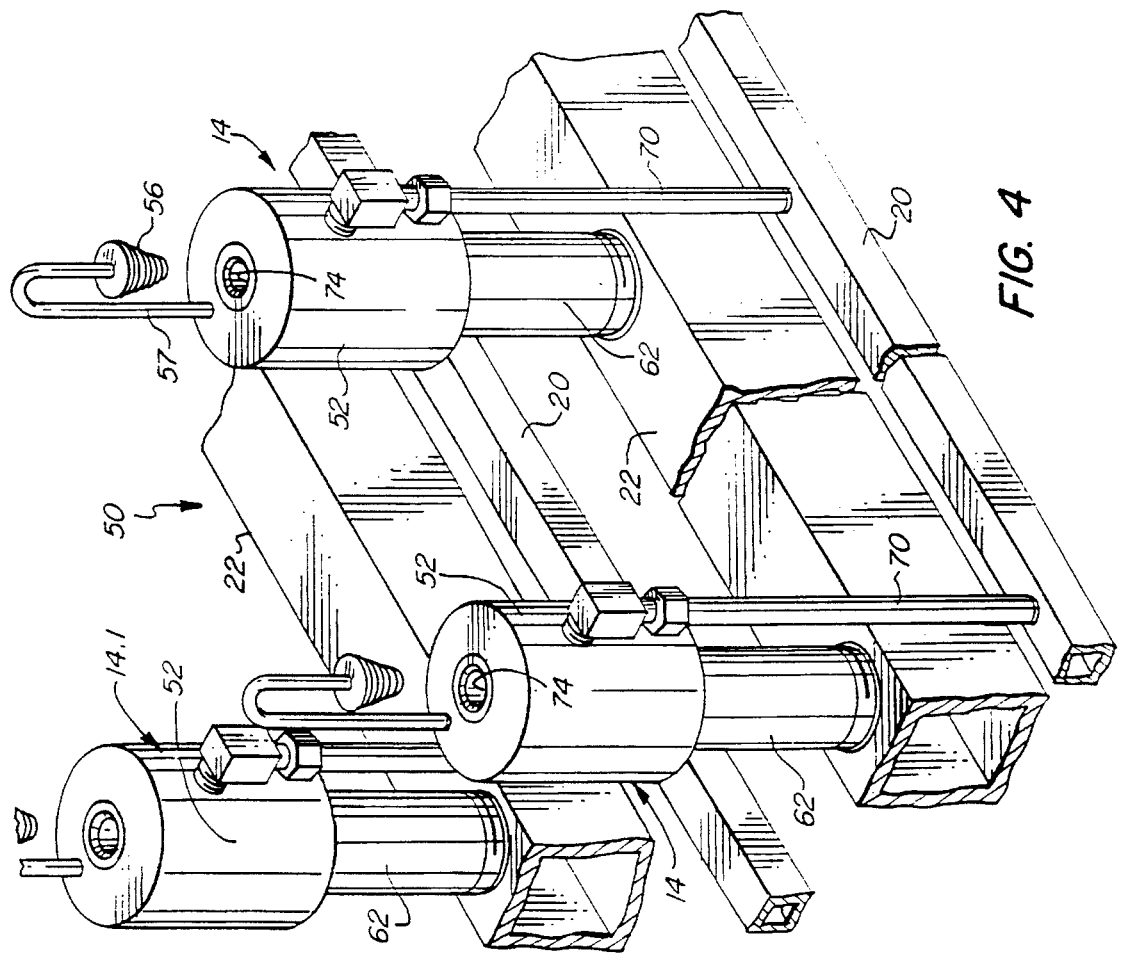

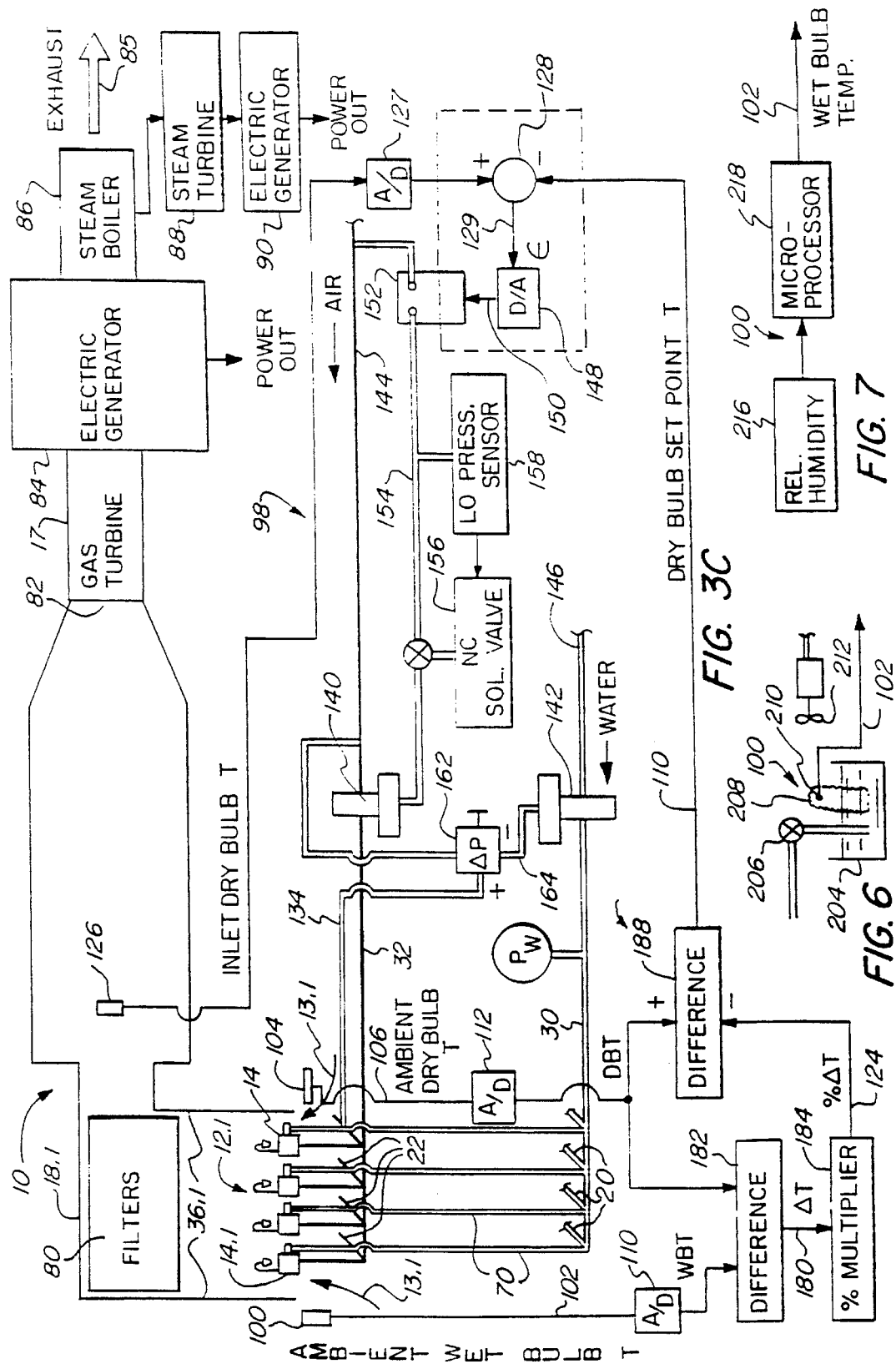

HUMIDIFYING SYSTEM

This is a divisional of applications Ser. No. 08/163,115 filed Dec. 6, 1993, now U.S. Pat. No. 5,463,873.

FIELD OF THE INVENTION

This invention relates to evaporative cooling generally and more specifically to an apparatus and method for evaporative cooling of the air leading into a gas turbine engine.

BACKGROUND OF THE INVENTION

Devices and techniques for evaporative cooling are extensively described in the art. Specifically, in the U.S. Pat. No. B1 4,042,010, a method and apparatus are described for humidifying air by injecting a fog with devices driven by pressurized air and water. One of the benefits described is a cooling effect when the fog generated by the device evaporates. In U.S. Pat. No. 4,546,375, a device for the injection of fog into a chamber is described using pressurized air and water in order to humidify an environment such as a building.

Gas turbine engines operate on natural gas or oil to compress incoming air and discharge a highly heated expanded air flow to provide power for an airplane or other transportation and are also commonly used to generate electrical power. There are many installations where gas turbine engines are used to produce electrical power in so-called "co-gen" applications. Typically, these involve a large plant which has a need to supply its own steam and electrical power and employs its own gas turbine to do so. Electric utilities frequently employ gas turbines to provide peak power generating capability that can be brought on line in a rapid manner.

The ability of a gas turbine/electric generator to provide electric power is affected by the temperature of the air entering the gas turbine. Typically, the cooler the inlet air temperature the greater power that can be obtained from the turbine. In many co-gen turbine installations an optimum operating temperature is established where the power produced tends to vary both above and below the optimum temperature. For example, in one gas turbine maximum output power occurs with the inlet air at 48 degrees F. At lower or higher air ambient temperatures the engine must be throttled back to stay within allowable compressor discharge and temperature limits unless the inlet air is chilled or heated to operate at a constant 48° F. See for instance an article by V. De Biasi entitled "New Performance Guarantees for LM6000 Production Gas Turbines", published in Gas Turbine World's January–February 1993 issue.

One technique for controlling the gas turbine inlet air temperature on warm days involves the placement of an evaporative cooling wet media in the path of the incoming air. A wet media, however, introduces an inlet air pressure drop which tends to reduce turbine performance. A wet media also cannot be controlled so that on higher humidity days, when less water is needed to achieve maximum evaporative cooling, an excessive amount of water is still consumed to wet the media. A wet media tends to use a substantial amount of water that is expensive in situations where deionized water is used to protect the gas turbine and is wasteful in areas where water is scarce.

A need, therefore, exists for an evaporative cooling technique which overcomes the deficiencies of wet media and yet is capable of providing a reliable and effective cooling of the inlet air for gas turbines.

SUMMARY OF THE INVENTION

In accordance with a method and system in accordance with the invention the cooling of an inlet air stream leading to a gas turbine engine is achieved by injecting fog over the crossectional area of an inlet air stream in a controlled manner so that the inlet air can absorb near its maximum capacity of evaporated water for a significant cooling of the inlet air.

It is desirable that fog can be introduced with evaporation into the air stream to avoid water droplets. Water droplets tend to clog subsequent filters and thus introduce undesirable inlet air pressure leading to a drop in turbine output power. Water droplets which pass through to the turbine tend to reduce its operating life. Hence, the fog should be introduced in such manner as will enable its absorption as vapor in the air stream.

This is achieved with one method and system in accordance with the invention by using a fog producing system that is regulated with a control signal that is representative of the capacity of the air stream to absorb water vapor from the fog produced by a large number of foggers distributed over the crossectional area of the inlet air stream. The control signal is produced by first generating a setpoint signal that is a function of the difference between the ambient inlet air dry bulb temperature and its wet bulb temperature. A feedback signal is obtained which is a representative of the dry bulb temperature of the inlet air after the fog has been introduced. The feedback signal and the setpoint signal are combined so as to generate the control signal, which then is applied to regulate the amount of fog to be injected into the inlet air stream.

As described herein for one form of the invention the setpoint signal is produced by sensing the ambient air wet and dry bulb temperatures, comparing signals representative of these latter temperatures and producing a signal indicative of their difference. Since the wet bulb temperature is the lowest temperature to which air can be cooled by the evaporation of the water, the difference signal is representative of the amount of water vapor that can be absorbed in the air stream leading to the turbine. A percentage of the difference signal is then generated and subtracted from a signal indicative of the inlet air dry bulb temperature to produce the setpoint signal for a feedback loop used in the control of the fogging system.

This setpoint signal is in effect set at some small amount above the wet bulb temperature so that the fogging system can approach the setpoint level without excessive use of water and wetting of subsequent filters used in the path of the inlet air stream and with preferably little condensation of water in the air stream in the form of water droplets.

With a fogging system in accordance with the invention substantial evaporative cooling is obtained resulting in significant improvements in the output power from the gas turbine during high inlet air temperature conditions. Depending on weather conditions turbine output power increases of the order of about two to about 5 percent can be achieved.

It is, therefore, all object of the invention to increase the output power of a gas turbine engine with the injection of fog into the inlet air leading to the turbine. It is a further object of the invention to provide a method and system for increasing the output power of a gas turbine engine with an inlet air evaporative cooling system that does not introduce a pressure drop, uses water sparingly and is practical to install and operate.

These and other objects and advantages of the invention can be understood from the following detailed description of one embodiment of the invention as shown in the drawings.

BRIEF DESCRIPTION OF DRAWINGS

FIG. 3C is a more detailed schematic block diagram of an evaporative cooling system for a gas turbine engine in accordance with the invention;

FIG. 4 is an enlarged partial perspective view of foggers used in the system shown in FIGS. 1–3; and FIG. 5 is an enlarged section view of a fogger used in the system shown in FIGS. 1–3.

FIGS. 6 and 7 are schematic views of different devices for generating wet bulb temperature signals for use in the system shown in FIG. 1.

DETAILED DESCRIPTION OF DRAWINGS

Figure 1:
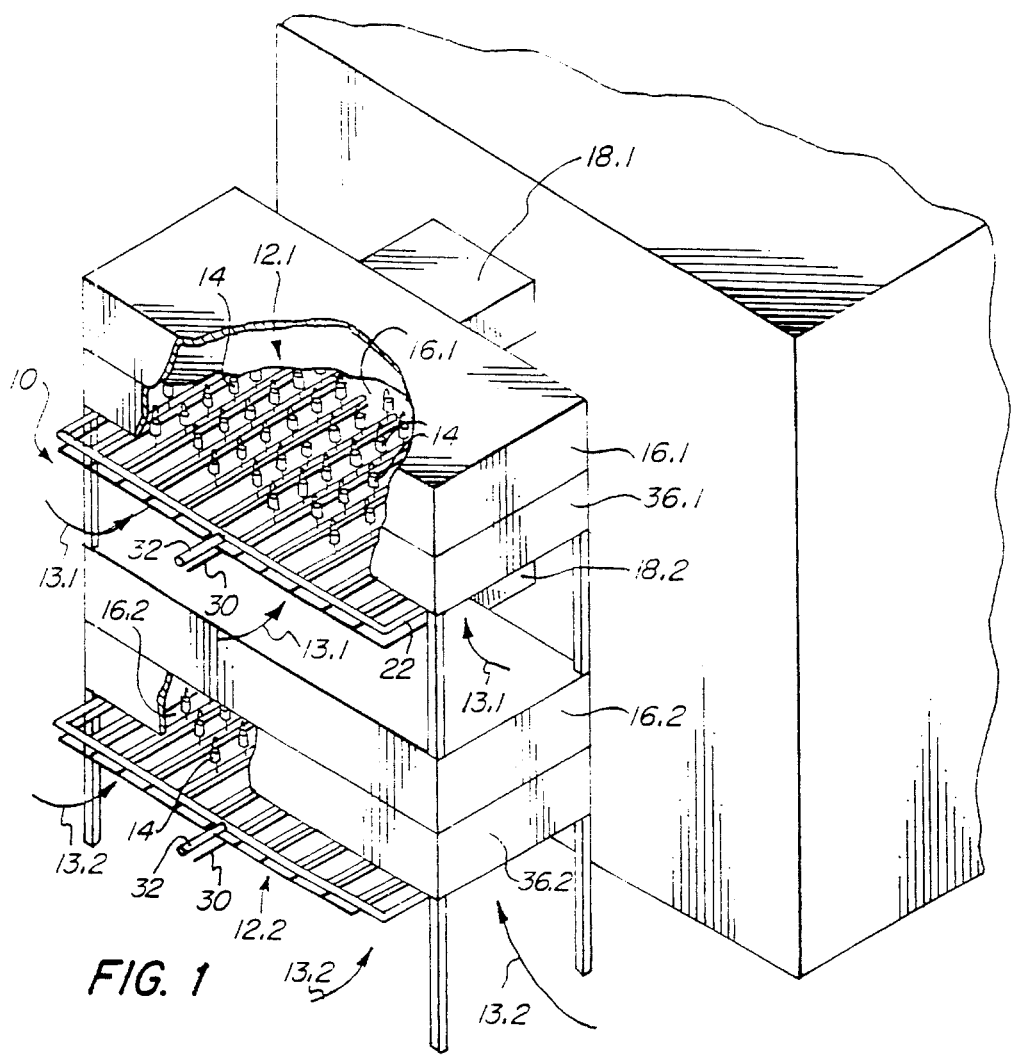
FIG. 1 is a perspective partial broken away view of an installed evaporative cooling system in accordance with the invention.
Figure 2:
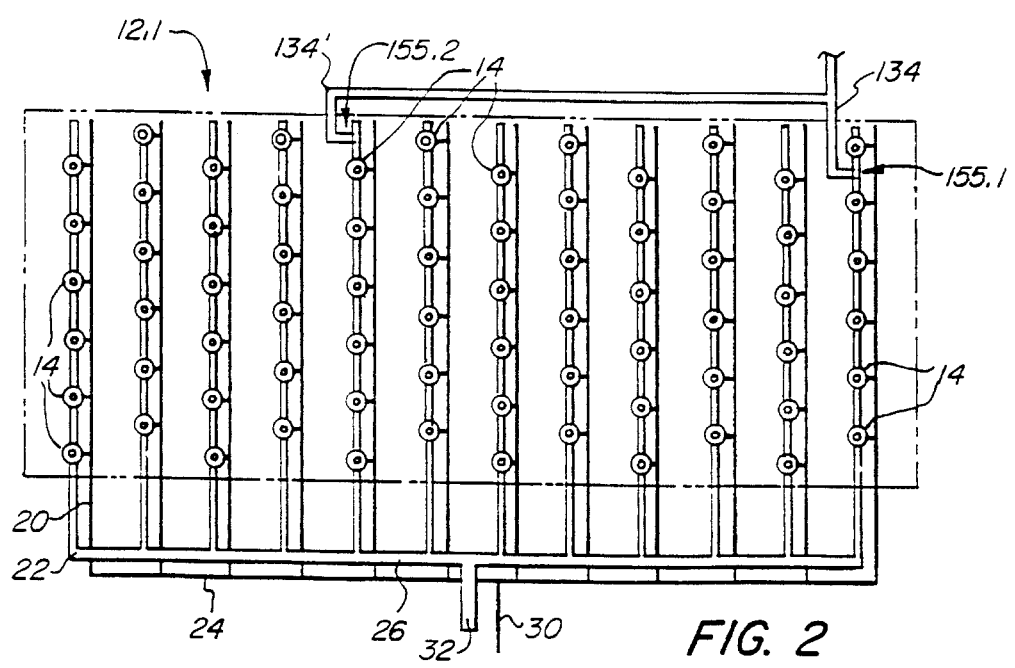
FIG. 2 is a plan view of an array of fogging elements used in the generation of fog for an evaporative cooling system of this invention.

With reference to FIGS. 1 and 2 an evaporative cooling system 10 in accordance with the invention is shown formed of arrays 12.1 and 12.2 of foggers 14 installed across air streams 13.1 and 13.2 leading to air inlets 16.1 and 16.2 coupled to air inlet ducts 18.1 and 18.2 respectively for a gas turbine engine 17, shown in FIG. 3. The arrays 12 are shown as mounted horizontally below vertically oriented air inlets 16, though it should be understood that evaporative cooling systems in accordance with the invention can also be placed with vertically oriented arrays before horizontal air inlet ducts as well as in such other orientations as may be appropriate for a particular gas turbine configuration.

The foggers 14 are formed of conventional devices that have been used in humidification systems for a number of years. See for example U.S. Pat. No. 4,564,375. The foggers use pressurized air and water supplied in air and water lines 20, 22 respectively. The foggers 14 and their connected air and water lines 20, 22 are arranged in grid patterns 12.1 and 12.2 with the air and water being supplied through appropriate manifolds 24, 26 from main supply conduits 30, 32 respectively. The conduits 30, 32 can be connected to a grid 12 at more than one location to reduce pressure drops in the lines and provide an adequate amount of water and air as this may be required by system 10.

The airstreams 13 leading to the gas turbine are produced by the turbine itself and it is preferred that the fogger grids 12 interfere as little as possible with the flow of air to the turbines. The configuration shown in FIG. 1 is for a retrofit installation where the fogging system 10 must be capable of injecting fog into the airstreams 13. Accordingly skirts 36 are added below the air inlets 16 to assure that most of the air streams 13 are exposed to the fog generated with the foggers 14 with as little unexposed bypass of the air streams as is practical. Since the air inlets 16 are stacked one above the other the heights of the skirts 36 are limited to prevent an undue restriction of the flow of air streams 13.

FIGS. 4 and 5 illustrate the fogger grids with greater detail with an enlargement of a portion 50 of grid 12.1 and a fogger 14. Each fogger 14 is formed of a cylindrical housing 52 having a central bore 54 which is in alignment with a resonator tip 56 mounted on a strut 57 that is clamped into the housing 52 by a set screw 58. Bore 54 is in communication with a threaded counter bore 60 into which an externally threaded tube 62 is screwed and clamps a seal 64 against the bottom end 66 of the counterbore 60. The other end 67 of tube 62 is screwed into a threaded opening 69 in rectangularly shaped air supply tube 22.

A rectangular water supply tube 20 (other cross-sectional shapes can be used) is connected by a fixed conduit 70 to the water bore 72 of fogger housing 52. The bore 72 intersects the air bore 54. The operation of the foggers are identical in that when air at pressure, usually in excess of 30 psi, is supplied in air conduit 22 and water is supplied in conduit 20 at a fixed lower pressure at a differential of typically in the range of about 17 psi, then a high speed stream of air and water emerge from the outlet 74 of bore 54. The stream impacts the flat surface 76 of the tapered resonator 56 to produce a plume of fine water particles that appear as fog and rapidly evaporate in an air stream 13.

Control over the shape of the fog plume can be obtained by adjusting the height of the strut 57 and thus that of the resonator 56 relative to the outlet aperture 74. The size of the plume and thus the amount of fog produced from any one fogger 14 can be controlled by modulating the air and water pressures together while keeping the differential pressure between them the same. The amount of fog deliverable from any one fogger is also a function of the diameter of bore 54 so that larger bores deliver a greater amount of fog than smaller bores. The foggers 14 are so spaced from each other that the overall effect from their fog patterns results in little unexposed bypass of an air stream.

With reference to FIG. 3C a block diagram view of the system 10 in accordance with the invention is shown for delivering the desired amount of fog to produce a desired amount of evaporative cooling of air stream 13.1 for grid 12.1. A similar control is employed for grid 12.2. The air is passed through filters 80 and delivered through the duct 18.1 to the inlet 82 of the gas turbine engine. The configuration for the gas turbine can change from site to site, but generally may involve electricity generating equipment as shown. Hence, the gas turbine 17 may in turn drive an electrical generator 84 and turbine exhaust gases, before being discharged to atmosphere at 85, are passed through an appropriate steam boiler 86 to produce steam. The steam in turn drives a steam turbine 88, which provides electrical power by driving an electrical generator 90.

Figures 3A, 3B:
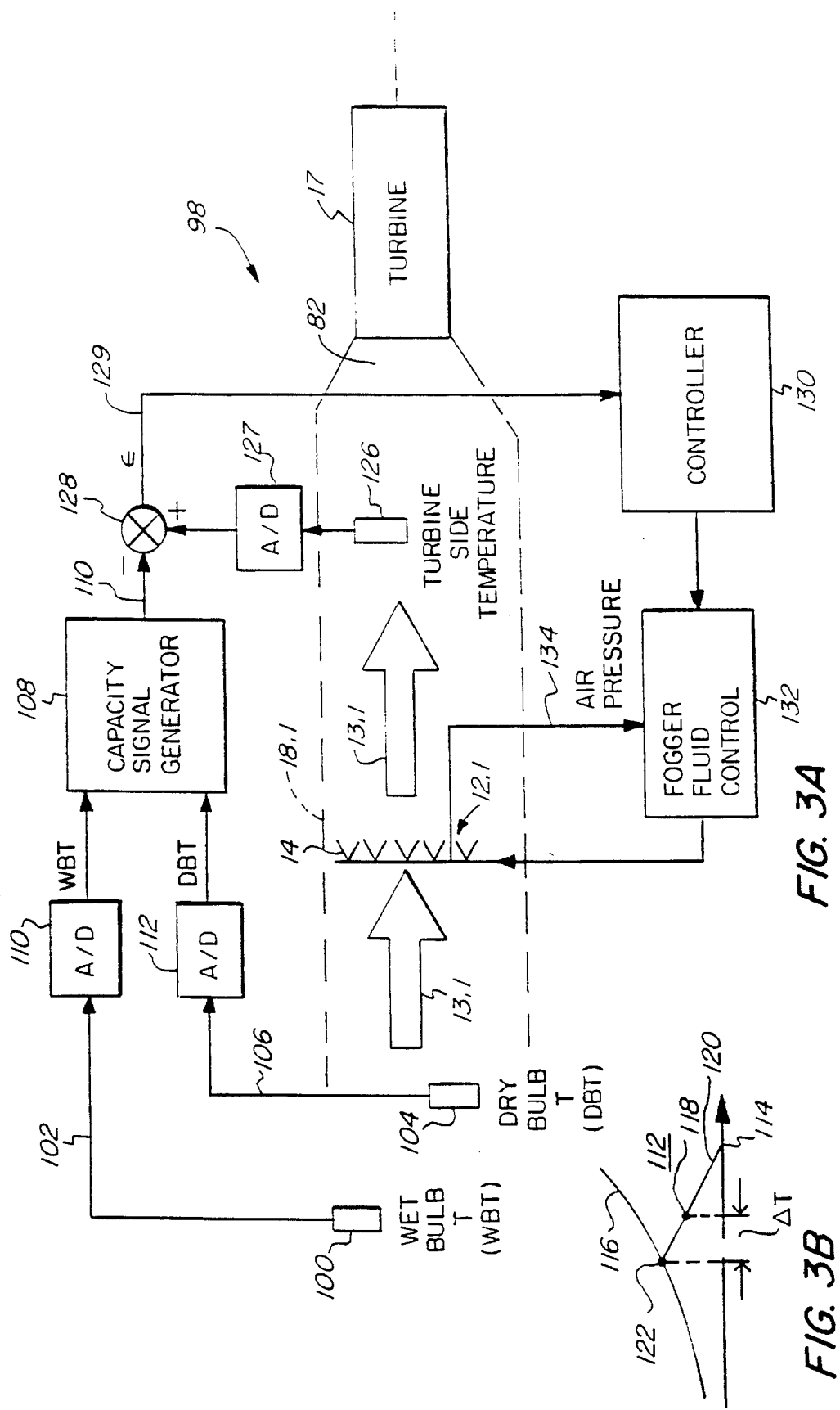
FIG. 3A is a block diagram view of the control employed with an evaporative cooling system in accordance with the invention.
FIG. 3B is a simplified view of a psychrometric chart to illustrate the operation of the control in FIGS. 3A and 3C.

With reference to FIGS. 3A and 3B, the amount of fog introduced into an air stream 13 is controlled in such manner that only so much fog is added as the ambient outside air can be expected to absorb during diverse weather conditions as may arise. This involves a control 98 with which a setpoint signal is produced representative of the capacity of the ambient air stream 13.1 to absorb fog. The setpoint signal represents a desired cooler dry bulb temperature to which the generation of fog from the foggers 14 is regulated to deliver the proper amount of fog.

Generation of the setpoint signal involves sensing the wet bulb temperature of the air stream prior to fogging. A wet bulb temperature sensor 100 is positioned within the air stream 13.1 and produces an electrical signal representative of the wet bulb temperature on line 102. A dry bulb temperature sensor 104 is placed within the air stream 13.1 to produce an electrical signal on line 106 representative of the temperature of the air stream.

A digital signal processor may be employed to combine these wet and dry bulb temperature signals in such manner that the fog produced by the foggers 14 enables a sufficient amount of evaporative cooling that is commensurate with the airstream's capacity to absorb the fog as water vapor. The processor may be formed with discrete networks or be programmed to perform the desired functions. Alternatively an analog circuit can be used.

The wet and dry bulb temperature signals on lines 102 and 106 respectively are digitized with D/A converters 110 and 112.

These temperature signals are combined in network 108 in such manner as to produce a capacity signal on output line 110 representative of the ability of the air stream 13.1 to absorb water vapor. This can be understood with reference to the portion 112 of a psychrometric chart reproduced in a simplified manner in FIG. 3B.

A psychrometric chart plots dry bulb air temperatures along the abscise 114 and has a saturation curve 116 along its upper boundary. Assuming the outside air stream 13.1 has a temperature of 70° F. with a relative humidity of 50%, point 118 is the starting place in chart 112.

By introducing as much fog as can be evaporated within the air stream, the lowest possible wet bulb temperature that can be achieved is determined by the wet bulb line 120 which passes through point 118 and intersects the saturation curve at 122. This intersection corresponds to the lowest wet bulb temperature which is about 58.5° F. The maximum available temperature drop that can be achieved with evaporative cooling is the difference, $\Delta T$, between the dry and wet bulb temperatures, namely in this example 12.5° F.

In practice, this cannot be easily achieved, primarily because some of the air stream 13.1 passes the fogger grid 12.1 without absorbing the maximum amount of water. Hence, the control 98 generates a set point on line 110 that is somewhat higher in temperature than the lowest possible wet bulb temperature. This is done by obtaining a measurement of the maximum evaporative cooling capacity of the air stream such as $\Delta T$ and then using a portion of that, say 85%, to generate a setpoint level on line 110 for a temperature of the air stream.

In the embodiment, the setpoint level is for the dry bulb temperature of the air stream on the turbine side of the fogger grid 12.1. The setpoint level could be the web bulb temperature for the air stream to be then compared with a comparable measurement of the wet bulb temperature of the fogger cooled air stream.

In the preferred embodiment, the dry bulb temperature of the fogged air stream 13.1 is sensed with temperature sensor 126 and the temperature signal, after conversion to digital form by D/A converter 127, compared with the set point level on line 110 with a comparator 128. The latter's output is then an error signal $\epsilon$ on line 129, which is fed back to a controller 130 and fogger fluid control 132 in such manner as will reduce the error to a minimum level. The sensor 126 can be so located that it senses the dry bulb temperature of the combined air streams 13.1 and 13.2; hence, in effect, the inlet air stream temperature for the turbine 117. The same dry bulb temperature signal can then be used as a feedback signal for the control of both fogger grids 12.1 and 12.1.

A second feedback control loop is obtained by sensing the actual pressure of the air supply in the fogger grid 12.1 and using this pressure signal along line 134 to maintain the pressure differential between the air and water pressures at the desired level.

In FIG. 3C the controller 130 and fogger fluid control 132 are illustrated with more detail. Fogger fluid control includes pressure regulators 140, 142 placed respectively in the air supply line 144 and water supply line 146.

The digital fogging capacity error signal on line 129 is converted back to an analog signal by a digital to analog converter 148. The analog signal on line 150 is applied to a transducer 152 which, being coupled to air supply line 144, produces a pneumatic pressure signal in line 154 proportional to the capacity error signal on line 129 and adjusted to regulate the pressure in air conduit 32 which supplies regulated air pressure to the foggers 14 in the grid 12.1. A normally closed solenoid valve 156 is in series with line 154 and a low pressure sensor 158 is a safety device used to normally force valve 156 open but enable it to close when the pressure to the regulator 140 in line 154 drops too low.

Water pressure is regulated by sensing the air pressure in the fogger grid 12.1 with conduit 134. Sensing of the air pressure in grid 12.1 is preferably done at a place deep into the grid 12.1 such as at 155.1 in FIG. 2 and can be averaged with similar pressure take-off points as 155.2 to which a conduit 134' is connected and directly coupled to conduit 134. This pressure feed back level is used by a pneumatic biasing relay 162 to establish a fixed pressure differial in output line 164. The pressure differential is pre-set, typically about 17 psi below the air pressure sensed by line 134.

Alternatively, one could sense a water pressure line in grid 12.1 and regulate the air pressure relative to the measured water pressure.

In FIG. 3C, the generation of a fog-absorbing capacity error signal is shown in greater detail. The difference $\Delta T$ between the wet and dry bulb temperatures is produced on output line 180 of a difference network 182. This difference represents the theoretical maximum amount of cooling capacity that can be obtained by fully saturating the airstream with fog.

Since in a practical situation some bypass of the airstream is likely to occur without absorbing the maximum amount of fog the full difference between the wet and dry bulb temperature signals preferably is not used to derive a signal for the control of the fogging grid 12.1. Instead, the maximum capacity signal $\Delta T$ is reduced by a factor in multiplier 184. This factor may vary depending upon the saturation effectiveness of the fogging grid 12 being controlled.

Generally, more than 95% saturation is difficult to achieve while 85% saturation of the airstream can be obtained. The reduction factor is, therefore, set at about 85% in multiplier 184 whose output 186, $0.85\Delta T$, is subtracted from the dry bulb temperature signal in a difference network 188. The output on line 110 from the difference network 188 then represents a setpoint level for the dry bulb temperature of the air stream 13.1.

Other reduction factors can be used in multiplier 184 and usually can be expected to be in such a range that the setpoint temperature signal on line 110 establishes a saturation for the airstream that is as high as possible but in practice tends to be in the range from about 82% to about 93%.

The wet bulb temperature sensor 100 may be a commercially available device. An accurate wet bulb temperature sensor can be made using a well known technique as illustrated in FIG. 6 where a small container 204 is supplied with water through an automatic control 206. A wicking element 208, which is in operative contact with the water and a temperature sensor 210, surrounds the temperature sensor with a moist envelope that is then subjected to an evaporating flow of air from a small motor driven propeller 212. The temperature signal from the sensor 210 on line 102 then represents the wet bulb temperature of the air stream 13.

Alternatively the wet bulb temperature may be derived from the measurement of a relative humidity measurement as shown in FIG. 7 at 216 and the resulting wet bulb temperature obtained with the use of a microprocessor 218 in a manner as is commercially available.

Having thus described one technique for evaporatively cooling of an air stream leading to a gas turbine engine, advantages of the invention can be appreciated. Significant improvements in turbine power output is achieved yet with a controlled amount of water for evaporative cooling. Variations from the described embodiment can be made without departing from the scope of the invention. The invention may be used with other internal combustion engines.

What is claimed is:

1. A systems for humidifying an airstream comprising:

fogger means formed with a plurality of foggers for producing fog in the airstream with said foggers arranged in an array extending across the airstream;

a grid of air supply tubes extending across the airstream and with the air supply tubes operatively connected to the foggers in the array;

a grid of water supply tubes extending across the air stream cross section and with the water supply tubes operatively connected to the foggers in the array;

feedback means connected to the grid of air supply tubes for producing a feedback signal representative of the air pressure in the grid of air supply tubes;

means for regulating the pressure of an air supply connected to the grid of air supply tubes and for regulating the pressure of a water supply connected to the grid of water supply tubes; and means responsive to the feedback signal and coupled to the regulating means for establishing a predetermined pressure differential between the grids of air supply tubes and water supply tubes.

2. A system for humidifying an air stream, comprising:

fogger means formed with a plurality of foggers arranged in an array to extend across an air stream;

a water supply tube extending along the array and operatively connected to the foggers in the array to provide pressurized water thereto;

an air supply tube extending along the array and operatively connected to the foggers in the array to provide pressurized air thereto;

means for regulating the pressure of air in the air supply tube and the pressure of water in the water supply tube;

means connected to the air supply tube for producing a feedback signal representative of the air pressure in the air supply tube at the foggers connected thereto;

means responsive to the feedback signal and coupled to the regulating means for establishing a predetermined pressure differential between the air supply tube and the water supply tube at the foggers connected thereto.

3. The system as claimed in claim 2 wherein the feedback means comprises a conduit operatively connected to the air supply tube in the vicinity of the foggers so as to convey an air pressure feedback signal representative of the pressure of air at the foggers.

4. The system as claimed in claim 3 wherein the means for establishing a predetermined pressure differential comprises means responsive to the air pressure feedback signal for producing an air control pressure that is at a preselected pressure level below the air pressure feedback signal and applying the air control pressure signal to the means for regulating the pressure in the water supply tube.

\* \* \* \* \*